(12) United States Patent
Matsumoto et al.

(10) Patent No.: US 8,786,733 B2
(45) Date of Patent: Jul. 22, 2014

(54) DISPLAY APPARATUS

(71) Applicant: Olympus Imaging Corp., Tokyo (JP)

(72) Inventors: Kenji Matsumoto, Fussa (JP); Kuniko Morisaki, Hachioji (JP); Yuka Ichikawa, Machida (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 13/735,333

(22) Filed: Jan. 7, 2013

(65) Prior Publication Data
US 2013/0147987 A1 Jun. 13, 2013

Related U.S. Application Data

(63) Continuation of application No. 12/752,899, filed on Apr. 1, 2010, now Pat. No. 8,350,925.

(30) Foreign Application Priority Data

Apr. 3, 2009 (JP) .................................. 2009-091148
Mar. 29, 2010 (JP) .................................. 2010-076090

(51) Int. Cl.
H04N 5/76 (2006.01)
H04N 5/222 (2006.01)

(52) U.S. Cl.
USPC .................................... 348/231.5; 348/333.05

(58) Field of Classification Search
USPC ..................... 348/231.2, 231.3, 231.5, 333.05
See application file for complete search history.

(56) References Cited

U.S. PATENT DOCUMENTS

| 7,809,192 | B2 * | 10/2010 | Gokturk et al. | 382/176 |
|---|---|---|---|---|
| 2006/0274978 | A1 * | 12/2006 | Fukuda et al. | 382/305 |
| 2007/0003113 | A1 * | 1/2007 | Goldberg | 382/118 |
| 2007/0172155 | A1 * | 7/2007 | Guckenberger | 382/305 |
| 2007/0188803 | A1 * | 8/2007 | Umeda | 358/1.15 |
| 2013/0028522 | A1 * | 1/2013 | Perlmutter et al. | 382/197 |
| 2013/0251217 | A1 * | 9/2013 | Adam et al. | 382/118 |

* cited by examiner

Primary Examiner — James Hannett
(74) Attorney, Agent, or Firm — John C. Pokotylo; Straub & Pokotylo

(57) ABSTRACT

A display apparatus includes an image recording section which records a plurality of image data items obtained on different dates and including image data items including a person, and a control section which displays one of the image data items selected from the image data items on a display section, retrieves another one of the image data items obtained on a date different from a date of the selected image data item and including the person, and displays the another one of the image data items on the display section.

17 Claims, 16 Drawing Sheets

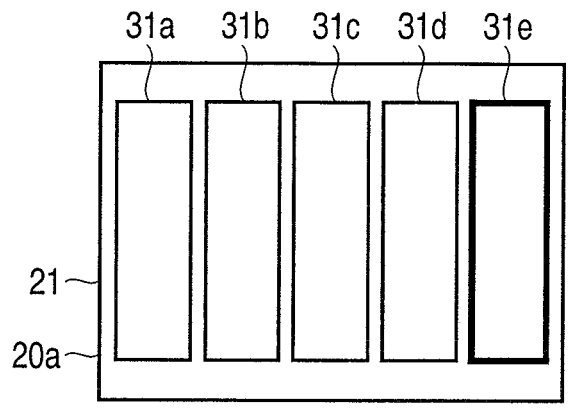
F I G. 4A
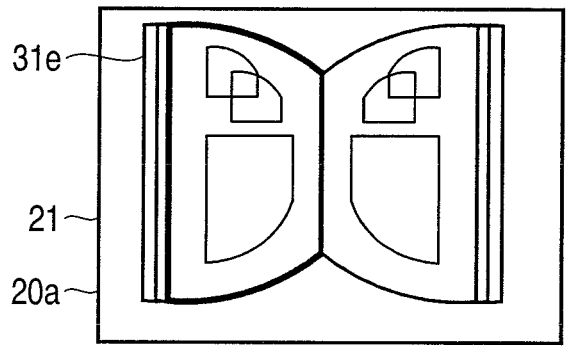
F I G. 4B
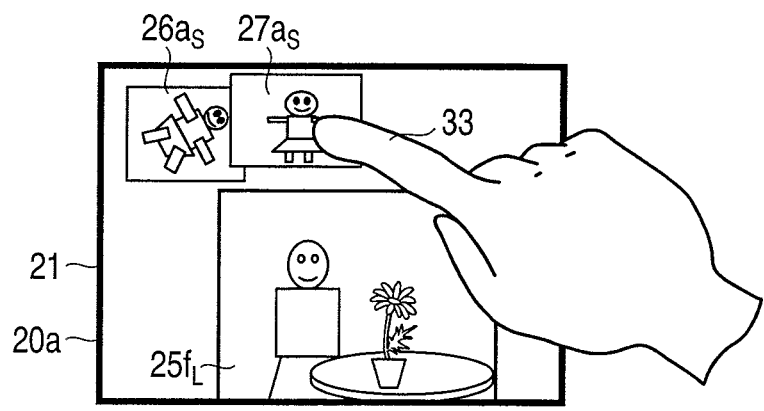
F I G. 4C

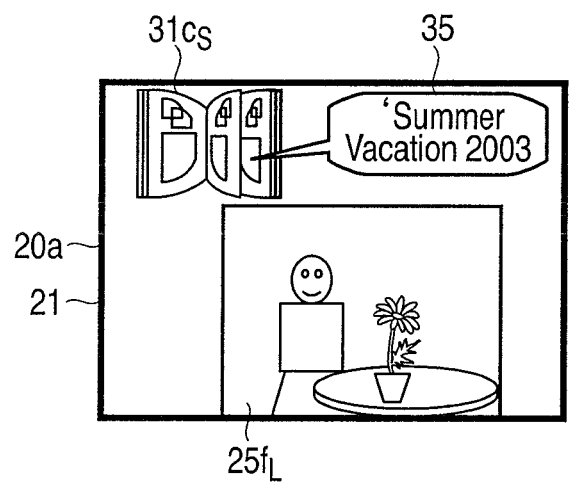
F I G. 4D
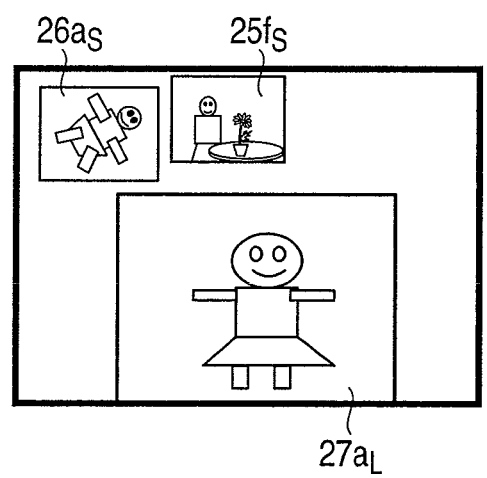
F I G. 4E

|  | Image 1 | Image 2 | Image 3 | Image 4 | Image 5 |
|---|---|---|---|---|---|
| Type of Image | Snapshot | Snapshot | Landscape | Snapshot | Snapshot |
| Number of Faces | 2 | 3 |  | 1 | 2 |
| Position, Characteristic, and Size of Faces — A1 |  |  |  |  |  |
| A2 |  |  |  |  |  |
| A3 |  |  |  |  |  |
| A4 | P-A · D2 | P-X · D3 |  |  | P-B · D2 |
| A5 |  | P-B · D3 |  | P-A · D1 | P-A · D2 |
| A6 | P-X · D3 | P-X · D3 |  |  |  |
| A7 |  |  |  |  |  |
| A8 |  |  |  |  |  |
| A9 |  |  |  |  |  |
| Main Color | Blue | White | Black | White | White |
| Date and Place | 9/15 None | 9/15 None | 9/15 Open House | 9/15 None | 9/15 None |
| Character Comments | None | None |  | None | None |

F I G. 7A

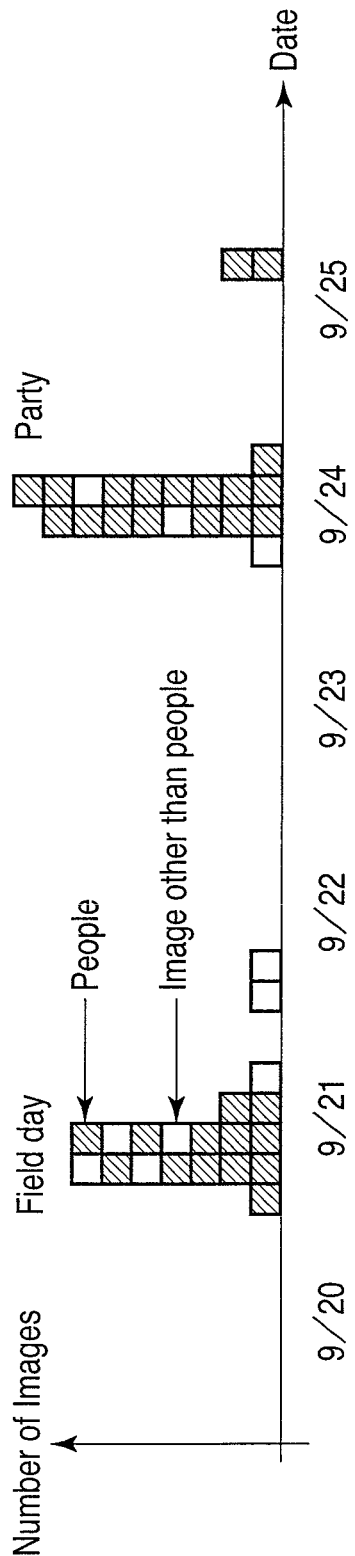
F I G. 9

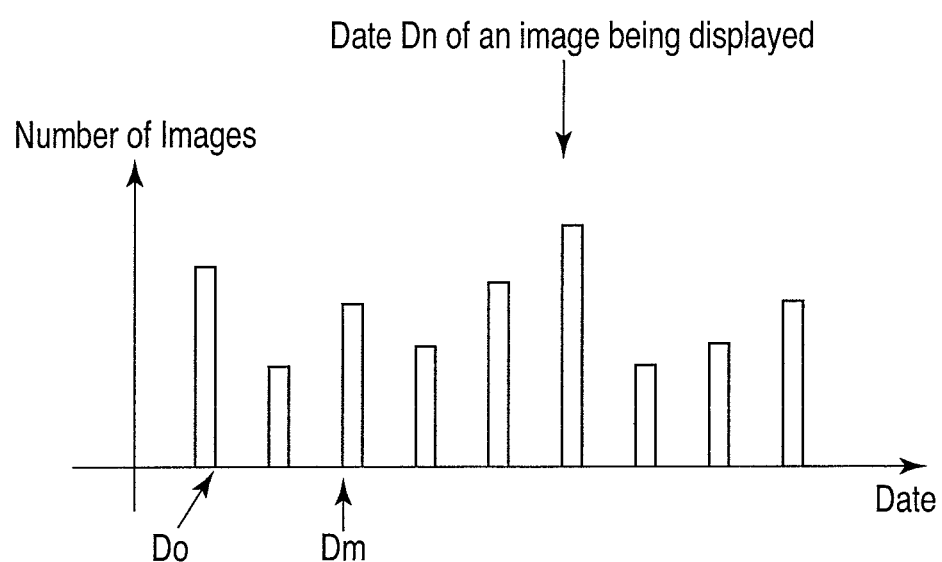
F I G. 13

DISPLAY APPARATUS

CROSS-REFERENCE TO RELATED APPLICATIONS

This application is a continuation application of U.S. patent application Ser. No. 12/752,899 (referred to as "the '899 application" and incorporated herein by reference) filed on Apr. 1, 2010, titled "DISPLAY APPARATUS" and listing Kenji MATSUMOTO, Kuniko MORISAKI and Yuka ICHIKAWA as the inventors, the '899 application claiming the benefit of priority from prior Japanese Patent Application Nos. 2009-091148, filed on Apr. 3, 2009, and 2010-076090, filed on Mar. 29, 2010, the entire contents of both of which are incorporated herein by reference.

BACKGROUND OF THE INVENTION

1. Field of the Invention

This invention relates to a display apparatus and an imaging apparatus having a display section, such as digital cameras and mobile phones equipped with a camera.

2. Description of the Related Art

In recent years, increase in capacity and reduction in price of memories have been made in progress. Cameras include a memory, and are capable of storing a number of images in the memory. A display panel such as a liquid crystal display is provided on the back surface of cameras. Increase in size of the display screen of the display panel has been made in progress. This display panel is generally used for viewing images by displaying the images stored in the memory of the camera.

There are demands for decorating pictures and making an enjoyable album including the pictures. To realize such demands, users wait for appearance of a technique of displaying decorated images on the display panel of cameras.

A technique of making an album using images taken by a camera is pursued. For example, Jpn. Pat. Appln. KOKAI Pub. No. 2007-104336 discloses a camera which displays templates when taking a picture, and takes a picture while checking an album effect. Jpn. Pat. Appln. KOKAI Pub. No. 9-214654 discloses a technique of selecting a title for a plurality of images having a common feature, and putting the images having the same title on a mount specified by the title when the images are played back.

BRIEF SUMMARY OF THE INVENTION

A display apparatus according to a first aspect of the present invention comprises: an image recording section which records a plurality of image data items obtained on different dates and including image data items including a person; a display section; and a control section which displays one of the image data items selected from the image data items on the display section, retrieves another one of the image data items obtained on a date different from a date of the selected image data item and including the person, and displays the another one of the image data items on the display section.

An imaging apparatus according to a second aspect of the present invention comprises: an imaging section which images a subject; an image recording section which records a plurality of image data items which are obtained by imaging by the imaging section, obtained on different dates and including image data items including a person as the subject; a display section; and a control section which displays one of the image data items selected from the image data items on the display section, retrieves another one of the image data items obtained on a date different from a date of the selected image data item and including the person, and displays the another one of the image data items on the display section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4A is a diagram illustrating an example of albums displayed by the camera.

FIG. 4B is a diagram illustrating transition of images in each selected album displayed by the camera.

FIG. 4C is a diagram illustrating display of a page of an album displayed by the camera.

FIG. 4D is a diagram illustrating transition of images in a manner of opening an album displayed by the camera.

FIG. 4E is a diagram illustrating enlarged display of an image retrieved by the camera.

FIG. 7A is a diagram illustrating a result of image classification in the flowchart of the control operation of the camera.

FIG. 9 is a diagram illustrating relation of the number of images to the date according to event determination by the camera.

FIG. 13 is a diagram illustrating the dates when pictures of a person were taken by the camera and distribution of the numbers of images taken on the respective dates.

DETAILED DESCRIPTION OF THE INVENTION

An embodiment of the present invention will be explained below with reference to drawings.

Figure 1:
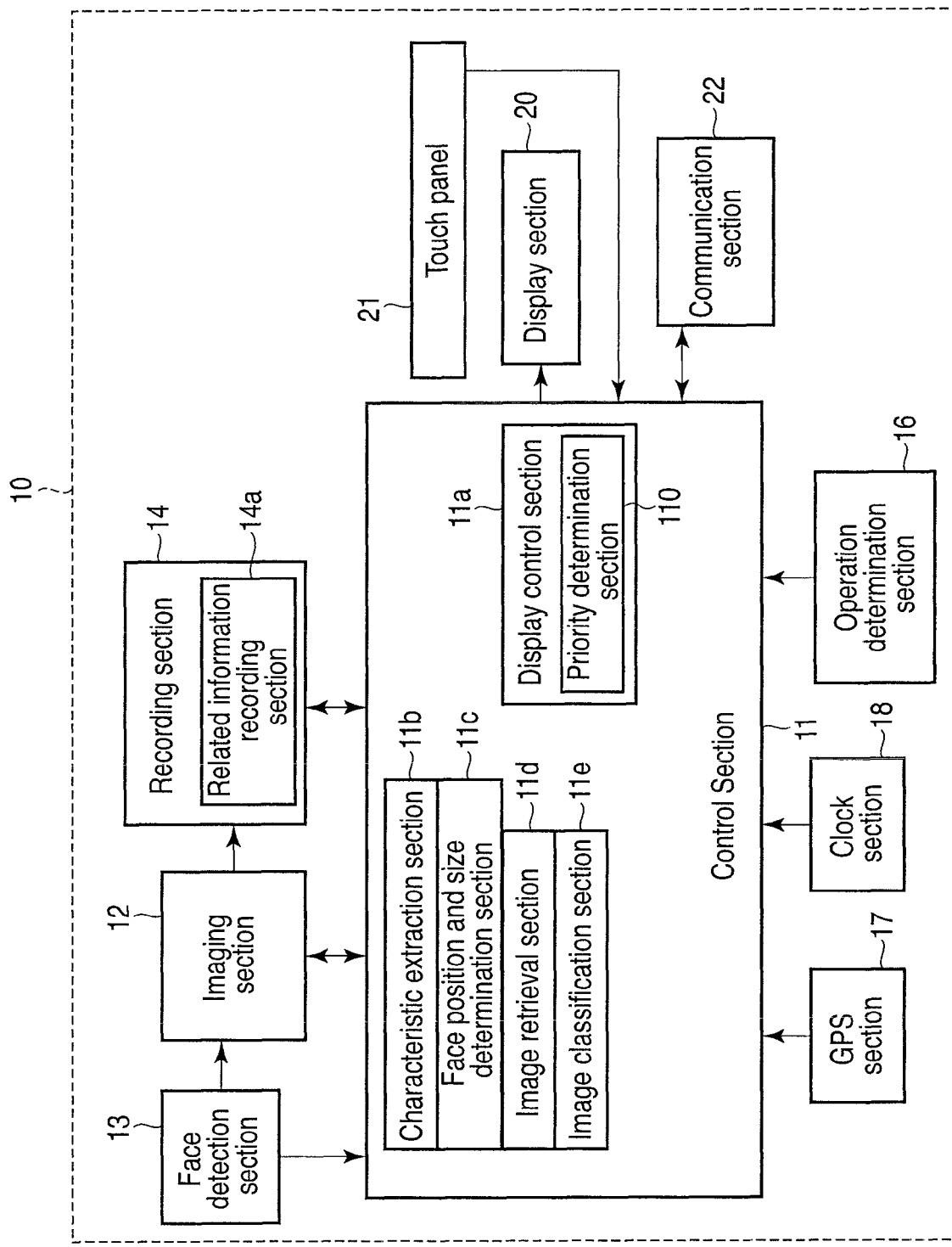
FIG. 1 is a block diagram illustrating a schematic structure of a camera according to an embodiment of the present invention.

FIG. 1 is a block diagram illustrating a schematic structure of a camera of the present invention. A camera 10 includes a control section 11, an imaging section 12, a face detection section 13, a recording section 14, an operation determination section 16, a global positioning system (GPS) section 17, a clock section 18, a display section 20, a touch panel 21, and a communication section 22.

The control section 11 controls the whole camera 10. The control section 11 performs image processing of image data obtained by the imaging section 12, such as emphasis of the edge, color correction, and compression, and selection of image data. The control section 11 manages image data in relation to people in the image data and the date of the image data. The control section 11 includes a display control section 11a, a characteristic extraction section 11b, a face position and size determination section 11c, an image retrieval section 11d, and an image classification section 11e. The recording section 14 is provided with a related information recording area 14a.

The display control section 11a controls display of the display section 20 formed of a liquid crystal display or the like.

The characteristic extraction section 11b extracts characteristics of the face and the color of the subject from image data. The face position and size determination section 11c determines the position and the size of the face image from image data. The image classification section 11e classifies images from the image data according to the type of main subject. The image retrieval section 11d retrieves each image data item on the basis of the result of image classification by the image classification section 11d.

The imaging section 12 includes an imaging lens and an imaging device and the like. The imaging section 12 takes an imaging luminous flux from the subject, and takes an image. The control section 11 performs image processing, such as edge emphasis, color correction, and image compression, for images taken by the imaging section 12, and records the processed image data on the recording section 14.

The face detection section 13 detects face images in the image data taken into the imaging section by well-known face image recognition processing. The recording section 14 records image data processed by the control section 11 and date data of the image data.

The operation determination section 16 includes various switches and a determination section. The various switches include switches for various modes of the camera 10, a power switch, and a release switch. When the user operates any of the switches, the control section 11 detects the operated switch. The operation determination section 16 selects image data such as wallpaper.

The GPS section 17 outputs information of places where photographs were taken (shooting place). The clock section 18 outputs date data when photographs were taken. The recording section 14 records the shooting date data, the shooting place information, and image data together. The date data and the shooting place information are used for arranging and retrieving the image data.

GPSs are expensive, and difficult for mounting to all the cameras. GPSs have to use weak electric waves from a plurality of satellites, and are difficult to use indoors and in underground shopping areas. In the embodiment, the present invention is explained in the case of using a method not depending on a GPS as much as possible. In the case of classifying a plurality of image data items according to events, cameras equipped with GPS are more convenient. For example, in the case of classifying a plurality of image data items taken in a trip, GPS can be used for determining whether the images were taken in the same place or not.

Display of the display section 20 is controlled by the display control section 11a. The display section 20 displays, for example, image data of the subject, character information corresponding to date data, and wallpapers.

The display control section 11a includes a priority determination section 110. The priority determination section 110 determines priority of image data displayed on the display section 20, in accordance with a classification result of the image data by the image classification section 11e. The priority determination section 110 performs a flowchart showing a first retrieval operation illustrated in FIG. 11 and a flowchart showing a second retrieval operation illustrated in FIG. 12, in accordance with a result of image classification by the image classification section 11e, for example, as illustrated in FIG. 7, and thereby determines priority of the image data displayed on the display section 20.

The display control section 11a displays, on the display section 20, an image data item selected from image data recorded on the recording section 14. In addition, the display control section 11a retrieves image data items which were taken on dates different from the date of the selected image data item and including the same person as the selected image data item, from the recording section 20, and displays the retrieved image data items on the display section 20, on the basis of priorities assigned to the image data items by the priority determination section 110.

The display control section 11a retrieves image data, on the basis of priority relating to the date and priority relating to the face part of the person in the image data.

The display control section 11a displays a selected image data item in a predetermined area in a display screen 20a of the display section 20, and displays a plurality of image data items taken on dates different from the date of the selected image data item outside the area.

The display control section 11a changes the displayed image data items taken on different dates by a predetermined number of images.

When an image data item is selected from the image data items taken on different dates, the display control section 11a displays the selected image data item in the area.

The display control section 11a displays information relating to the image data items taken on different dates by characters.

The priority determination section 110 retrieves image data, on the basis of priority relating to the events in which the image data was obtained and priority of the face part of the person in the image data.

The priority determination section 110 determines a priority of a face part of a person in accordance with the position and the size of the face part.

The priority determination section 110 gives an event higher priority, on the basis of the date of an old image data item or each date of the old image data item and the image data item being displayed on the display section 20.

The priority determination section 110 retrieves an image data item, giving an image data item of the earliest date a higher priority among image data items recorded on the recording section 14, and giving an image data item including the face of the same person as the person in the selected image data item a higher priority.

The priority determination section 110 retrieves an image data item corresponding to a date intermediate between the date of the selected image data item and the date of the oldest image data, and retrieves an image data item, giving the retrieved image data item a higher priority and a image data item including the face of the same person as the person.

The priority determination section 110 sets a priority concerning the date higher than a priority concerning the face part of a person.

The touch panel 21 is disposed on the display screen of the display section 20, and includes a plurality of touch switches. When the user touches the touch panel 21, a switch located in a part selected by the touch operates, and outputs a signal corresponding to the position of the touched part.

The communication section 22 performs data communication between the camera 10 and external devices, such as a personal computer (PC) and a television (TV), to transmit/receive image data and information accompanying the image data. The communication section 22, when wireless, is an infrared link or a wireless local area network (LAN), and when wired, is USB.

In a shooting mode, the camera 10 successively obtains image data from the imaging section 12 when the power is turned on, even when no pictures are taken, and displays the image data on the display section 20. The user observes an image displayed on the display section 20, and can check framing and a photo opportunity. The display control section 11a does not only display an image on the whole surface of the display screen of the display section 20. For example, in a shooting mode, the display control section 11a prepares background image data for decorating image data, and can display the image data together with the background image data on the display section 20.

Next, display by a playback mode of the camera 10 will be explained with reference to FIG. 2.

FIGS. 2A to 2F illustrate an example of image data items obtained by the camera 10 when, for example, the user went on a trip. The number of image data items of pictures obtained in the trip is 6, as illustrated in FIGS. 2A to 2F. The image data items can broadly be classified into two groups, that is, image data items 25c, 25d and 25f being portrait pictures, the main subjects of which are people, and image data items 25a, 25b and 25e being landscape pictures, the main subjects of which are not people. The portrait pictures include pictures including a person, and a picture including a plurality of people.

The camera 10 includes a function of classifying image data items. Classification of image data items includes classification under the groups "people" and "landscape" and the like, and classification according to events such as "trip" and "party". Classification into the groups "people" and "landscape" is performed for each image data item. A plurality of image data items are classified into each of the groups "people" and "landscape" to form an each image data group. In classification according to events, image data items of each of the groups "people" and "landscape" are classified under events.

Figure 2A:
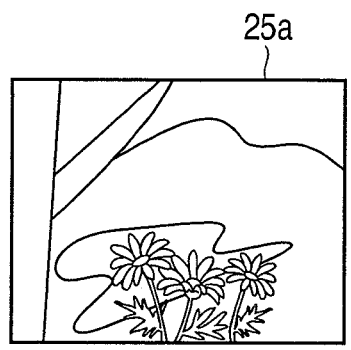
FIG. 2A is a diagram for explaining display by a playback mode of the camera.
Figure 2B:
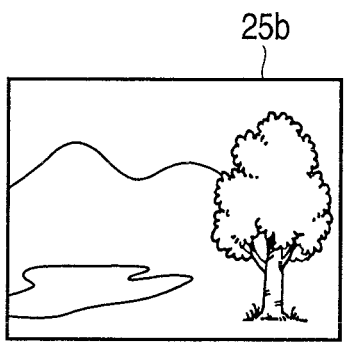
FIG. 2B is a diagram for explaining display by the playback mode of the camera.
Figure 2C:
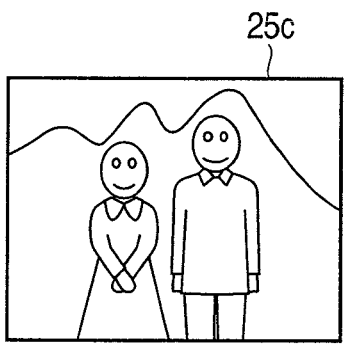
FIG. 2C is a diagram for explaining display by the playback mode of the camera.
Figure 2D:
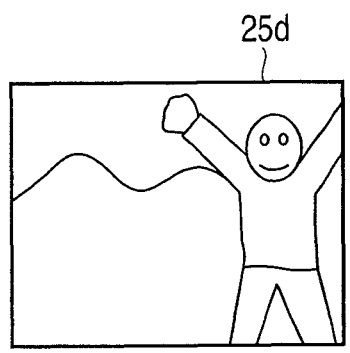
FIG. 2D is a diagram for explaining display by the playback mode of the camera.
Figure 2E:
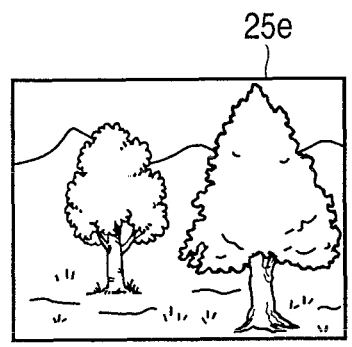
FIG. 2E is a diagram for explaining display by the playback mode of the camera.
Figure 2F:
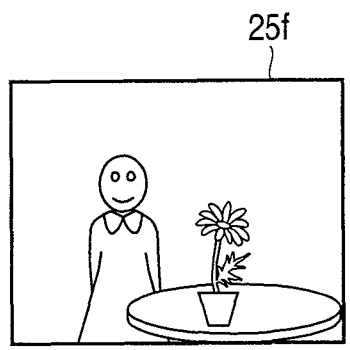
FIG. 2F is a diagram for explaining display by the playback mode of the camera.
Figure 3:
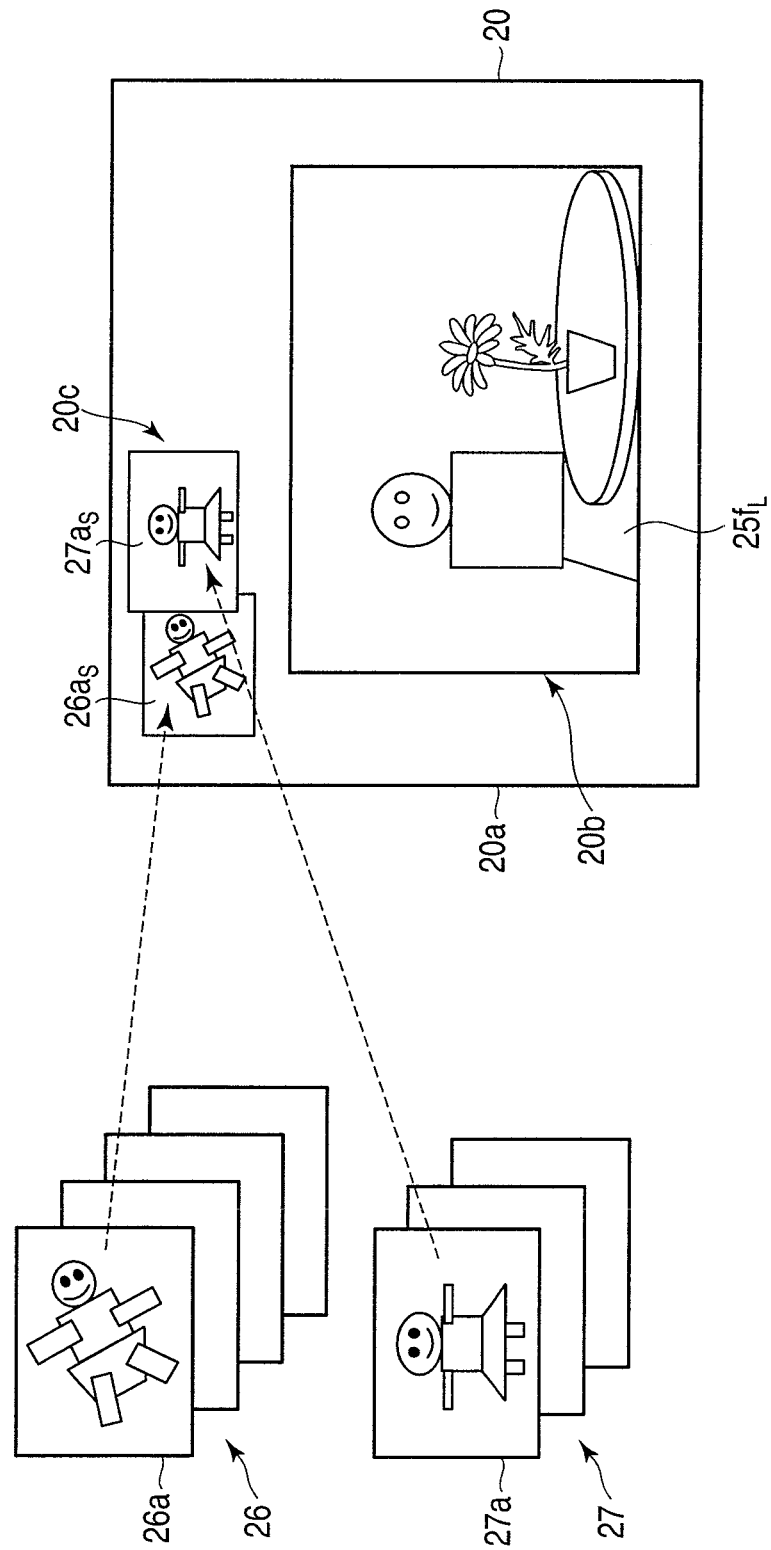
FIG. 3 is a diagram illustrating an example of display of an image of a landscape picture and an example of display of pictures of a person by the playback mode of the camera.

The camera 10 records classified image data items. The camera 10 can determine image data items of which person are included in image data group of which event. As illustrated in FIG. 3, the display section 20 has a display screen 20a. The camera 10 has a function of retrieving image data items and displaying them on the display screen 20a (hereinafter referred to as "album display"). Specifically, the user views image data items 25a to 25f of a trip illustrated in FIGS. 2A to 2F. In this state, suppose that the image data item 25f of a specific person illustrated in FIG. 2F is displayed as an enlarged image data item 25fL in a first display frame 20b in the display screen 20a. The camera 10 retrieves other similar image data items including the specific person, for example, image data items 26 and 27, and displays image data items 26as and 27as obtained by reducing the image data items 26 and 27 in a second display frame 20c. The second display frame 20c is located outside the first display frame 20b.

The image data item 25fL enlarged in the first display frame 20b is an image to be observed. It is necessary to display the other image data items 26as and 27as displayed in the second display frame 20c not to interfere with the image data item 25fL. The image data items 26as and 27as are displayed to overlap with each other not to occupy much area. When the image data items 26as and 27as include face images, the camera 10 overlaps the image data items 26as and 27as not to conceal the face images.

In such an album display, the enlarged image data item 25fL can be decorated by the similar image data items 26as and 27as. Thereby, the image data can be enjoyably observed in a joyful atmosphere. When the viewer notices that there is an image which attracts the viewer's interest in the second display frame 20c, the viewer can change image data items, and select an image data item displayed in the second display frame 20c, to view the interesting image. The viewer can enjoy images, such as viewing only images which attract the viewer's interest, by viewing images displayed on the second display frame 20c first.

Such a contrivance is very convenient in cameras recording growth of a child, and enables automatic retrieval of images from past albums including pictures of the child. The contrivance is applicable to not only cameras, but also any recording apparatuses having a display section. Although the past things of a child tend to be forgotten as the child grows up, they can be remembered by such contrivance.

Next, an example of displaying playback images by the camera 10 will be explained below with reference to FIGS. 4A to 4E.

The camera 10 performs album display as shown in FIG. 3 as follows. For example, as illustrated in FIG. 4A, albums 31a, 31b, 31c, (31d, and 31e) are virtually displayed on the display screen 20a in a manner of aligning their spines. When one of the spines, for example, the album 31e is selected, an image of opening the album 31e is displayed as illustrated in FIG. 4B. An image of successively turning the pages of the album 31e is referred to as transition image. FIG. 4C illustrates an image of a page of the album 31e when the album 31e is opened.

When an image of a person is displayed as an enlarged image data item 25fL, image data items of the same person taken in different events are displayed in a reduced size in the second display frame 20c outside the first display frame 20b. Thereby, display on the display screen 20a can be made lively and joyful in a casual manner, and the atmosphere of the album can be enhanced.

When an interesting image data item appears in the image data items displayed outside the first display frame 20b, the interesting image data item outside the first display frame 20b is touched by, for example, a user's finger 33 as illustrated in FIG. 4C. A switch of a part selected by the touch in the touch panel 21 is operated, and the touch panel 21 outputs a signal corresponding to the position of the touched part. The control section 11 retrieves an image data item corresponding to the touched part on the basis of the signal from the touch panel 21, and displays an enlarged image data item 27aL obtained by enlarging the image data item 27a on the display screen 20a, as illustrated in FIG. 4E.

While the image data item 27a is retrieved, the display control section 11a displays the transition image of opening a reduced album 31cs on the display screen 20a, as illustrated in FIG. 4D. A page enclosed by a bold frame in the album 31cs means that the target image is located in a place corresponding to the page.

The display control section 11a may display characters indicating the time and the event in which the retrieved image data item 27a was taken, such as characters "Summer Vacation in 2003" 35, as illustrated in FIG. 4D. This reminds the viewer of the past things more clearly. The title of the event and the like can be input or selected by the user by using the touch panel 21.

Figure 5:
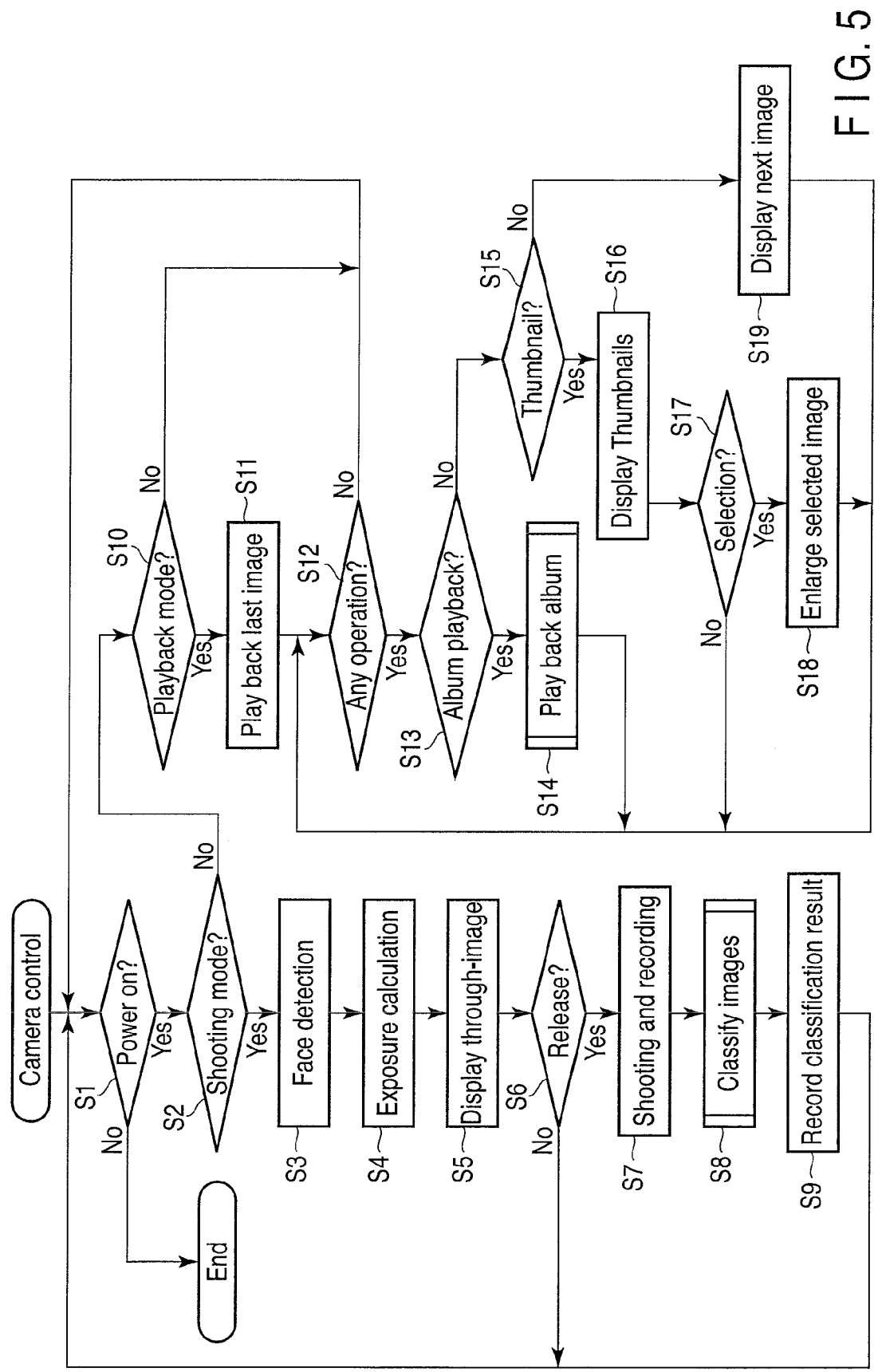
FIG. 5 is a flowchart of a control operation of the camera.

Next, operation of the camera 10 will be explained below with reference to a flowchart of a control operation illustrated in FIG. 5.

In step S1, the control section 11 determines the state of a power switch in the determination section 16. When the power is turned on, the control section 11 moves to step S2, in which it can be determined whether the camera 10 is in a shooting mode or a playback mode.

In step S2, the control section 11 determines whether the camera 10 is in the shooting mode or not. When the camera 10 is in the shooting mode, the control section 11 moves to step S3, in which the face detection section 13 detects whether the image data item includes the face of a person or not on the basis of an image signal from the imaging section 12. In step S4, the control section 11 performs exposure calculation to properly display the image data item, in particular, the face part. In step S5, the control section 11 displays the image data item calculated in step S4 as through image on the display section 20.

By detection of face images described above, it is possible to determine the places, the number, and the sizes of the faces of people, and whether they are smiling faces or not based on change in parts of the faces.

In step S6, the control section 11 determines whether a state of release operation by the release switch. When release operation is performed, the control section 11 moves to step S7, and performs exposure operation by the imaging section 13, and recording operation on the recording section 14. In step S8, the control section 11 performs a subroutine "image classification". Operation of the subroutine "image classification" will be explained later. In step S9, the control section 11 records a result of classification as illustrated in FIG. 7A on a related information recording section 14a. Thereafter, the control section 11 moves back to step S1.

In step S6, when no release operation is performed, the control section 11 moves to step S1. In step S2, when the camera 10 is not in the shooting mode, the control section 11 moves to step S10. In step S10, the control section 11 determines whether the camera 10 is in the playback mode or not. When the camera 10 is not in the playback mode, the control section 11 moves to step S1. When the camera 10 is in the playback mode, the control section 11 moves to step S11, and operates a playback program.

In the playback mode of step S11, the control section 11 displays the last taken image. In step S12, the control section 11 determines whether any operation is performed by the user or not. When no operation is performed, the control section 11 moves to step S1. When any operation is performed, the control section 11 moves to step S13, and determines whether the operation is album playback or not.

When album playback is designated in step S13, the control section 11 moves to step S14, performs the subroutine "album playback", and then moves to step S12. Detailed operation of the subroutine "album playback" will be explained later.

On the other hand, when an operation other than album playback is designated in step S13, the control section 11 moves to step S15. In step S15, the control section 11 determines whether the operation is thumbnail display or not. The thumbnail display is an operation of displaying a table of reduced images. As a result, when the thumbnail display is designated, the control section 11 moves to step S16, and displays thumbnail images on the display section 20.

In step S17, the control section 11 determines whether there is an image selected from the image data items displayed as thumbnails by step S16, based on presence of operation on the touch panel 21. When there is any selected image data item, the control section 11 moves to step S18, and enlarges and displays the selected image data item on the display section 20. Thereafter, the control section 11 moves to step S12. On the other hand, when there is no selected image in the state of the thumbnail display, the control section 11 moves to step S11.

When the operation is not thumbnail display as a result of determination in step S15, the control section 11 moves to step S19, and simply performs an image shift. In this case, since the last taken image data item is displayed, the control section 11 displays an image data item of the previous frame on the display section 20. Thereafter, the control section 11 moves to step S12.

Next, detailed operation of the subroutine "image classification" will be explained below, with reference to a flowchart of image classification illustrated in FIG. 6.

When image retrieval is performed, it is necessary to promptly retrieve a target image. In the present embodiment, the image classification section 11e performs image classification. In the image classification, information items of image data items mainly obtained in shooting are related to the respective image data items in the form of a table as illustrated in FIG. 7A, and a result thereof is recorded on the related information recording section 14a in the recording section 14.

Figure 6:
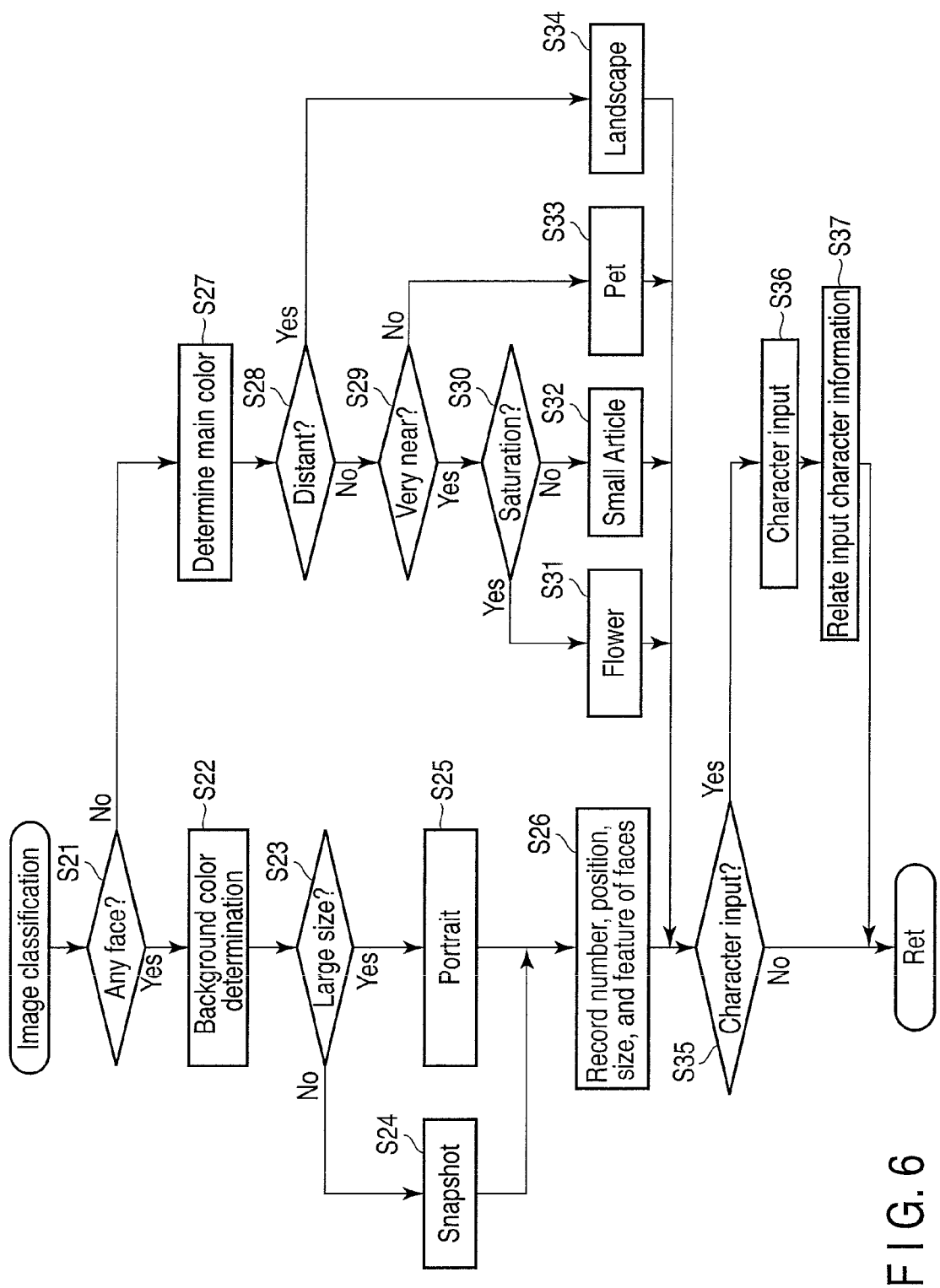
FIG. 6 is a flowchart illustrating an image classification operation in the flowchart of the control operation of the camera.

Efficiency of retrieval of information of image data can be improved by categorizing image data items according to the flowchart of image classification illustrated in FIG. 6, as well as time information obtained by clocking by the clock section 18 and shooting place information obtained by the GPS section 17. Specifically, it is determined whether an image data item includes any face images, and the size and the number of face images are determined, by using a focusing signal, the distance from the subject, color information of the image data item, or a result of face detection by the face detection section 13. In addition, in accordance with information such as the characteristic of the face image, it is determined in which category the image data item belongs to, such as "snapshots", "portraits", "flowers", "small articles", "pets", and "landscapes". The category "snapshots" include image data items including full-length figures of people and much background. The category "portraits" include image data items mainly including the expressions of the faces of people.

Although the category of an image data item may be determined by analyzing the subject from the image data item, image data items may be broadly classified into categories of frequently taken scenes, as in steps S24, S25, and S31 to S34 of the flowchart of image classification illustrated in FIG. 6.

In step S21, the control section 11 determines whether there is a face image in the subject in an image data item. As a result, image data items are roughly classified according to whether it is a picture of people or not. When there is a face image, the control section 11 moves to step S22, and determines a distinctive feature of the color of the background, not the color of the face. Then, the control section 11 records a result of determination on the related information recording section 14a.

In step S23, the face position and size determination section 11c determines whether the face is large or not. When the size of the face is smaller than a predetermined face size D1, the face position and size determination section 11c moves to step S24, and determines that the image data item is a snapshot. On the other hand, when the face is larger than the predetermined value, the face position and size determination section 11c moves to step S25, and determines that the image data item is a portrait.

In step S26, the control section 11 records the number, the position, the size, and the characteristic of the faces on the related information recording section 14a. Thereafter, the control section 11 goes through the subroutine, and moves to step S9 illustrated in FIG. 5.

On the other hand, when it is determined in step 21 that there is no face in the taken image, that is, there are no people in the taken image, the control section 11 moves to step S27, and determines the main color of the display screen 20a, such as the color of the center portion of the display screen 20a. In steps S28 to S30, the control section 11 classifies the image data item. In step S28, the control section 11 determines the distance from the subject. As a result, when the distance is small, the control section 11 determines in step S29 whether the subject is very near or not. When the subject is very near, the control section 11 determines saturation of the color in step S30.

In step S28, the control section 11 determines the distance from the subject, mainly on the basis of distance information in focusing. When it is determined that the subject is distant, the control section 11 moves to step S34, and determines that the image data item is a landscape picture. In steps S28 and S29, when the subject is not very near although it is not distant, the control section 11 moves to step S33 and determines that the image data item is an image data item of a pet or the like. When the color has high saturation in step S30, the control section 11 moves to step S31, and determines that the image data item is an image data item of flowers or the like. When the color has low saturation in step S30, the control section 11 moves to step S32, and determines that the image data item is an image data item of small articles.

In step S35, the control section 11 determines whether there is an input of characters or not. When there is an input of characters, the control section 11 moves to step S36. When there is no input of characters, the control section 11 moves to step S9 illustrated in FIG. 5. In step S36, characters are input by the user by operation of the touch panel 21. In step S37, the control section 11 records the input character information in a character comment space in the classification table as illustrated in FIG. 7A, and relates the character information to the image data item. This operation enables display of characters, such as "Summer Vacation in 2003" 35 illustrated in FIG. 4D. Thereafter, the control section 11 goes through the subroutine, and moves to step S9 illustrated in FIG. 5. The relation between the image data items and the related information illustrated in FIG. 7A is recorded on the related information recording section 14a.

FIG. 7A illustrates a result of classification of image data items. In the classification result, the image data items "1" to "5" are classified according to items "type of image data item", "number of faces", "position, characteristic and size of face(s)", "main color", and "date and place".

The item "type of image data item" indicates the type of picture, as to whether the image data item is a snapshot or a landscape.

The item "number of faces" indicates the total number of faces in the image data item.

Figure 7B:
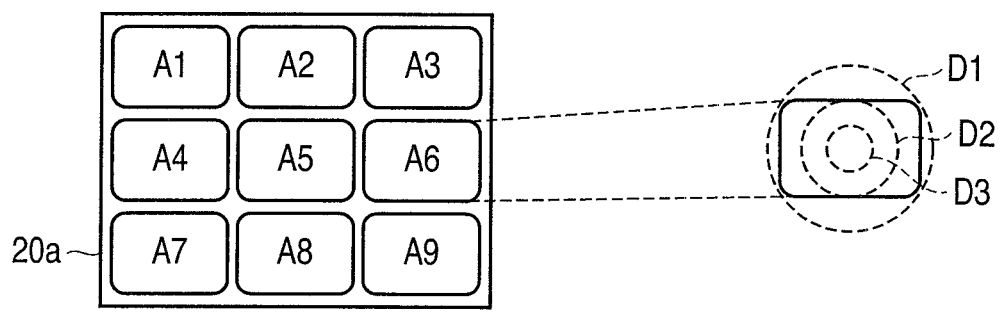
FIG. 7B is a diagram illustrating areas for identifying a position of a face on a display screen of the camera, and an example of a size of the face for the area.

The item "position, characteristic and size of face(s)" indicates the following. The position of the face(s) indicates in which area of areas A1 to A9 a face exists, supposing that the display screen 20a is divided into nine areas as illustrated in FIG. 7B. For example, the result shows that there is a face in each of areas A4 and A6 in the image data item "1". The position of each face is determined by the face position and size determination section 11c.

The characteristic of the face indicates which of predetermined face patterns recorded on the related information recording section 14a in advance the face corresponds to. In this case, the symbol "P-A" indicates a recorded face pattern A. The symbol "P-B" indicates a recorded face pattern B. The symbol "P-X" indicates that determination is impossible. The symbol "P-X" indicates that the face is of a pattern other than the recorded patterns. The predetermined face patterns are obtained by, for example, recording image data of the user's family in advance, and image data items are classified by comparing them with the recorded image data. The characteristic of the face is extracted by the characteristic extraction section 11b, and compared with the recorded patterns.

The size of the face is indicated by three levels D1, D2 and D3 with respect to each area A1 to A9, as illustrated in the right part of FIG. 7B. For example, the result shows that, in the image data item "1", the area A4 includes a face having a size of level D2, and the area A6 includes a face having a size of level D3. The size of the face is determined by the face position and size determination section 11c.

The item "main color" indicates the main color in the background colors of the image data item. The main color is determined by the control section 11.

The item "date and place" indicates the date and time, and the place of shooting. Although only the date is shown in this embodiment, when the time and the place of shooting is recorded on the related information recording section 14a, the result also shows the time and the place recorded on the related information recording section 14a.

The item "character comments" indicates whether the image data item includes characters. The character comments can be a title on the spine of the album illustrated in FIG. 4A, or comments displayed when a transition image is displayed.

According to the classification result of image data items illustrated in FIG. 7A, the image data item "1" is a snapshot taken on September 15. In the image data item "1", the area A4 has a face which is of pattern A and has a size of level D2, and the area A6 has a face which is of pattern X and has a size of level D3. In addition, the image data item "1" has the main color of blue, and has no character comments.

With such image relating information, it is possible to promptly and efficiently perform image data retrieval.

Even with a simple classification result illustrated in FIG. 7A, the control section 11 can efficiently retrieve a face image, since the control section 11 can exclude image data items classified in steps S31 to S34 from the object of retrieval.

Figure 8:
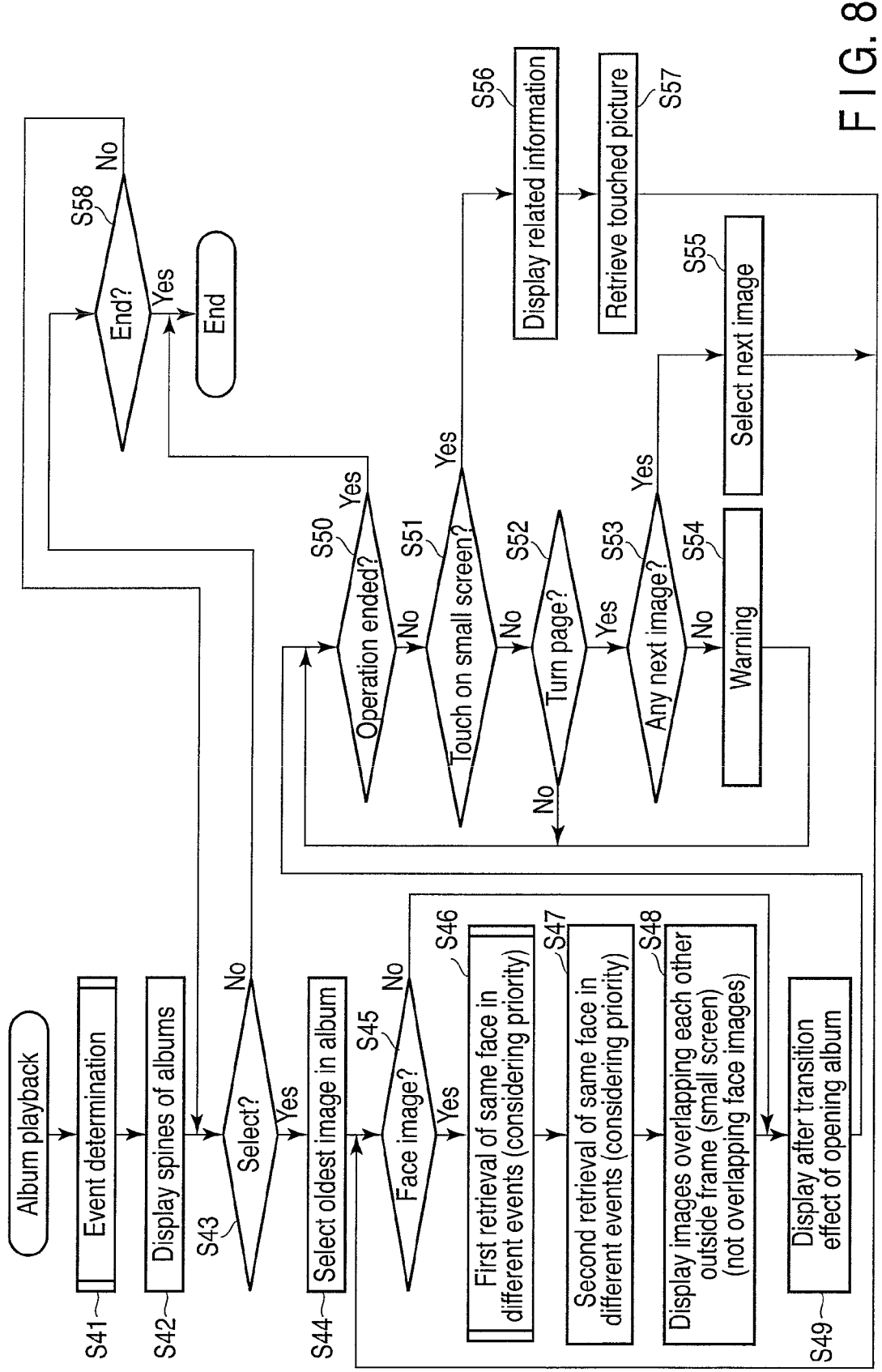
FIG. 8 is a flowchart illustrating an album playback operation in the flowchart of the control operation of the camera.

Next, operation of the subroutine "album playback" will be explained below, with reference to a flowchart of album playback illustrated in FIG. 8.

In step S41, the control section 11 performs the subroutine "event determination". The control section 11 uses a clock function of the clock section 18 for event determination, collects image data items taken in a predetermined period and deals with the image data items as an album.

In step S42, the control section 11 displays a virtual bookshelf including spines of albums on the display screen 20a. In step S43, the control section 11 determines whether operation of selecting an album is performed or not.

When no operation of selecting an album is performed, the control section 11 moves to step S59, and determines whether the subroutine has ended or not. When it is determined that the subroutine has not ended, the control section 11 moves to step S43. When the subroutine has ended, the control section 11 goes through the subroutine and moves to step S12 illustrated in FIG. 5.

When any of the albums 31a to 31e illustrated in FIG. 4A is selected by the operation determination section 16, the control section 11 moves to step S44, selects a group of image data items taken at the earliest time in the album selected in step S43, and displays the image data items on the display screen 20a. The control section 11 is capable of display to open the album and view image data items for each page, as illustrated in FIG. 4B. FIG. 4B illustrates a state in which any of the albums 31a to 31e illustrated in FIG. 4A is opened to display pages thereof. The page enclosed by a bold line in FIG. 4B is displayed as selected page.

In step S45, the control section 11 determines whether the image data item is a face image or not. When the image data item is not a face image as a result of determination, the control section 11 moves to step S50. When the image data item is a face image, the control section 11 moves to step S46, and retrieves image data items having the same face feature as the face image from another event, by using the face feature illustrated in FIG. 7A (first retrieval). In this case, in step S46, since there are many image data items of different events, the control section 11 selects and displays image data items with high priorities.

For example, when there is an image data item which has been displayed even once in viewing after being put into the playback mode, the displayed image date item is, for example, marked, and the priority of the marked image data item is lowered. Lowering the priority is performed to deal with the problem that displaying only similar image data items in the first display frame 20b bores the user, and removes the fun of unexpectedly finding old pictures using the outside part of the first display frame 20b.

Specifically, in step S47, the control section 11 determines whether there is any image data item which has not been displayed. When there is no image data item which has not been displayed, the control section 11 moves to step S49. When there is an image data item which has not been displayed, the control section 11 moves to step S48, and performs retrieval to display an image data item which has not been displayed as priority.

There are cases where there are a number of image data items which have not been displayed. In step S47, the control section 11 retrieves image data items having the same face feature as the face image from different events (second retrieval), in the same manner as step S46. In this case, since there are a number of image data items of different events in step S47, the control section 11 selects and displays image data items of higher priorities.

Although the number of image data items retrieved may be two or three as illustrated in FIG. 3, but more image data items can be retrieved. In this flowchart, to simplify the explanation, one image data item is displayed.

In step S48, the control section 11 performs preparation to display the retrieved image data items as reduced image data items in the second display frame 20c outside the first display frame 20b.

In step S49, the control section 11 displays on the display section 20 a transition image in which pages of the album 31e are successively turned as illustrated in FIG. 4B, and performs album display illustrated in FIG. 3 by selecting a page in the album 31e.

In step S50, the control section 11 determines whether operation has ended or not. When the operation has ended, the control section 11 goes through the subroutine, and moves to step S12 illustrated in FIG. 5. When any operation is performed, the control section 11 determines in step S52 whether any of reduced image data items displayed in the second display frame 20c as illustrated in FIG. 4C is touched or not.

When no reduced image data items are touched, the control section 11 moves to step S53, and determines whether operation of turning the page of the album is performed or not. This operation is detected by the touch panel 21 and the control section 21 when, for example, the touch panel 21 is rubbed by the user's finger 33. In another embodiment, the operation determination section 16 determines whether operation of turning the page of the album is performed or not by operating an advance switch or the like. When there is no operation of turning the page, the control section 11 moves to step S50. When operation of turning the page is performed, the control section 11 moves to step S53.

In step S53, the control section 11 determines whether next image data item exists or not. When there is no next image data item as a result of determination, the control section 11 moves to step S54, and issues a warning. The warning is displayed, for example, as notice on the display screen 20a.

When there is a next image data item, the control section 11 moves to step S56, and advances the image data items in the shooting order. The operation of turning the page is not limited to advancing the image data items, but may allow the user reviewing image data items which have been viewed before. This structure is achieved by determining the direction of turning the pages, on the basis of detection of operating a return switch in the operation determination section 16 or the direction of rubbing the touch panel 21. Also when operation of turning the page is performed, the control section 11 moves to step S45 and produces an effect of the transition image.

In step S51, when the control section 11 determines that any of the reduced image data items displayed in the second display frame 20c is touched, the display control section 11a detects the touch on the image data item, moves to step S56, and displays related information of the reduced image data item on the display section 20. In step S57, the touched picture is selected by the control section 11. Thereafter, the control section 11 moves to step S45, and produces the transition effect.

In the case where the touched picture is a face image, the control section 11 displays image data items showing the person's growth in the second display frame 20c.

According to the above control, it is possible to enjoy viewing image data items, with operation feeling similar to paper albums which have been familiar since long ago. It is a merit of digital image data that reduced image data items decorating each image data item can be displayed in the second display frame 20c, and the reduced image data items can be selected. This structure enables enjoying image data in which only interesting image data items are viewed.

Although in this embodiment the present invention is applied to the display section 20 of the camera 10, it can be applied to other display apparatuses such as televisions.

Next, operation of event determination will be explained below.

The camera 10 can record the shooting date and a result of face detection. With respect to image data items taken by the camera 10, the relation between the number of taken image data items and the shooting date can be displayed as a graph as illustrated in FIG. 9. In the graph display, a day is divided into six periods, and the number of image data items are accumulated for each divided period of time. Images in which a face is detected as a result of face detection are shown by diagonal lines. It is analogized in what event each image was taken, on the basis of the number of images for each time period, or the number of people included in each image data item.

When a plurality of image data items are collected (image group) in a certain time period, it is determined that there was an event. For example, the date "9/21 (September 21)" was a field day. On the date "9/25 (September 25)" we had a party. When image data items taken on "September 25" are played back, they are displayed, being divided from the image data items of the previous day (September 24).

When an image group includes any one image data item to which a comment is input, the same comment is applied to image data items which belong to the same image group and has no comment.

Figure 10:
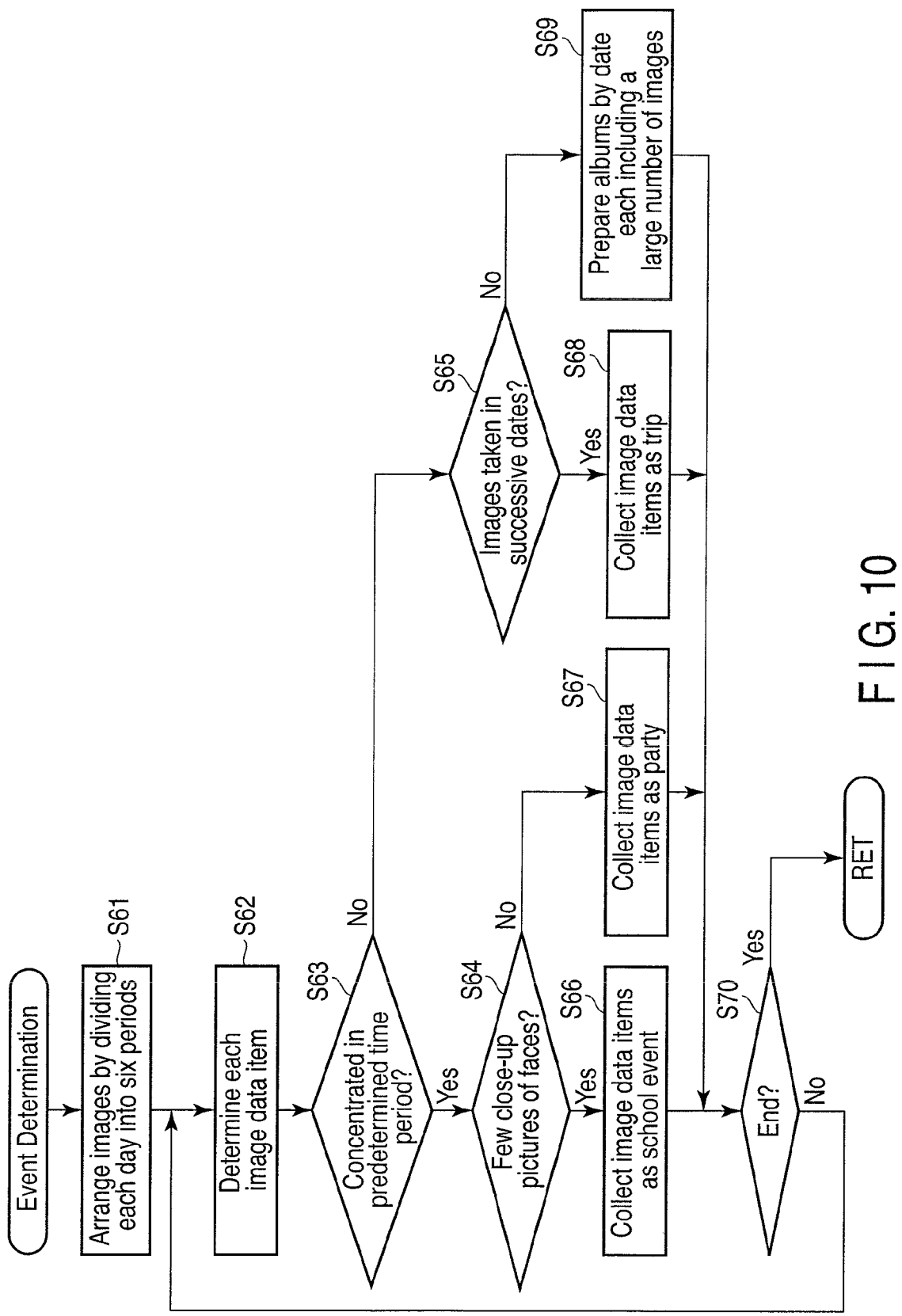
FIG. 10 is a flowchart illustrating an event determination operation of the camera.

Next, detailed processing operation of the subroutine "event determination" will be explained below, with reference to a flowchart of event determination illustrated in FIG. 10.

When the camera 10 enters the subroutine, the control section 11 performs, in step S61, image arrangement of dividing each data into six periods as illustrated in the graph of FIG. 9. In step S62, the control section 11 determines which group each image data item belongs to. In step S63, the control section 11 determines whether taken image data items are concentrated in a predetermined time period. When image data items are concentrated in a predetermined time period, such as "September 21" and "September 25" illustrated in the graph of FIG. 9, the control section 11 moves to step S64. If not, the control section 11 moves to step S65.

In step S64, the control section 11 determines whether the taken image data items include many close-ups of faces or not. When they do not include many close-ups of faces (include many landscape images), the control section 11 moves to step S66, and collects the image data items as "school event". When they include many close-ups of faces, the control section 11 moves to step S67, and collects the image data items as "party".

In step S65, the control section 11 determines whether a plurality of images were taken in successive dates. When a plurality of images were taken in successive dates, the control section 11 collects the images as "trip". This is based on that taken images are distributed in one day in trips. When a plurality of images were not taken in successive days, the control section 11 moves to step S69, and prepares albums each including a large number of images by date. Specifically, in step S69, the control section 11 collects images of events other than events collected in steps S66, S67 and S68, by month or season, to form groups each including at least 10 images.

The types of events are determined according to the degree of concentration of taken image data items and presence/absence of face images. When each image data item is put into any of albums, the control section 11 determines in step S70 whether event determination has ended or not. When event determination has not ended as a result of determination, the control section 11 moves to step S62, and repeats the above processing operation. When event determination has ended, the control section 11 goes through the subroutine, and moves to step S42 illustrated in FIG. 8.

Figure 12:
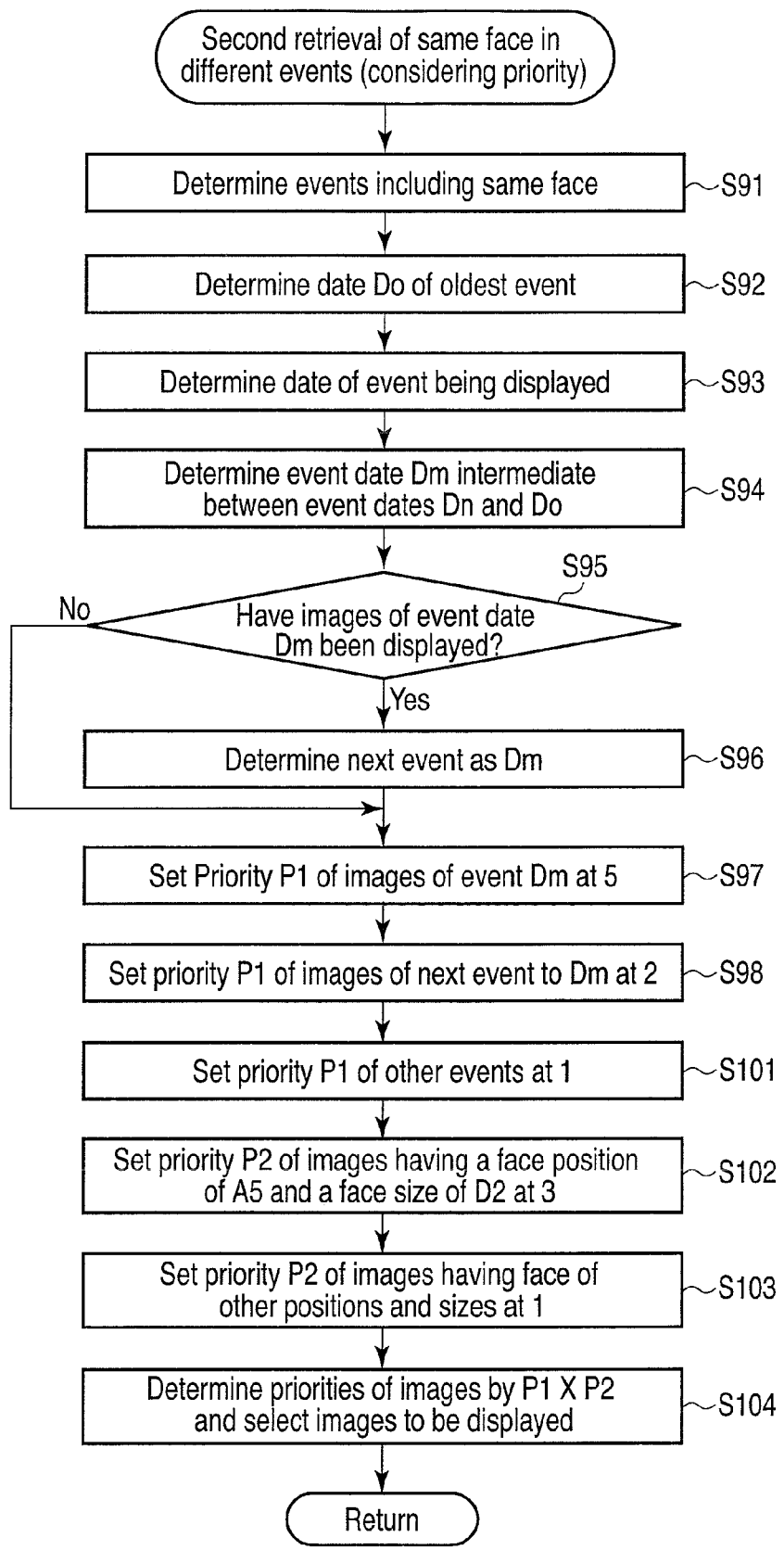
FIG. 12 is a flowchart illustrating a second retrieval operation for the same face in different events in the flowchart of the control operation of the camera.

FIG. 12 is a graph illustrating the numbers of images taken on respective dates for image data items including a certain person. The camera 10 records an image data group having a distribution of the number of images for the dates illustrated in the graph. An image data item being viewed by the camera 10, for example, an image data item of date Dn includes a person. When the past image data items including the person are displayed on wallpaper to view a growth record of the subject, it is important image data item of which date is displayed with higher priority.

As illustrated in the graph of FIG. 12, there are large number of image data items which can be displayed with higher priority. From the viewpoint of "growth record", image data items should be retrieved from the past data. When a plurality of image data items are displayed, it is desirable to display image data items of different events to remember many things as much as possible.

As a result, when an image (face image) of a person is viewed, image data items of different events including face images of the person are retrieved from the face image data displayed in the viewing.

Figure 11:
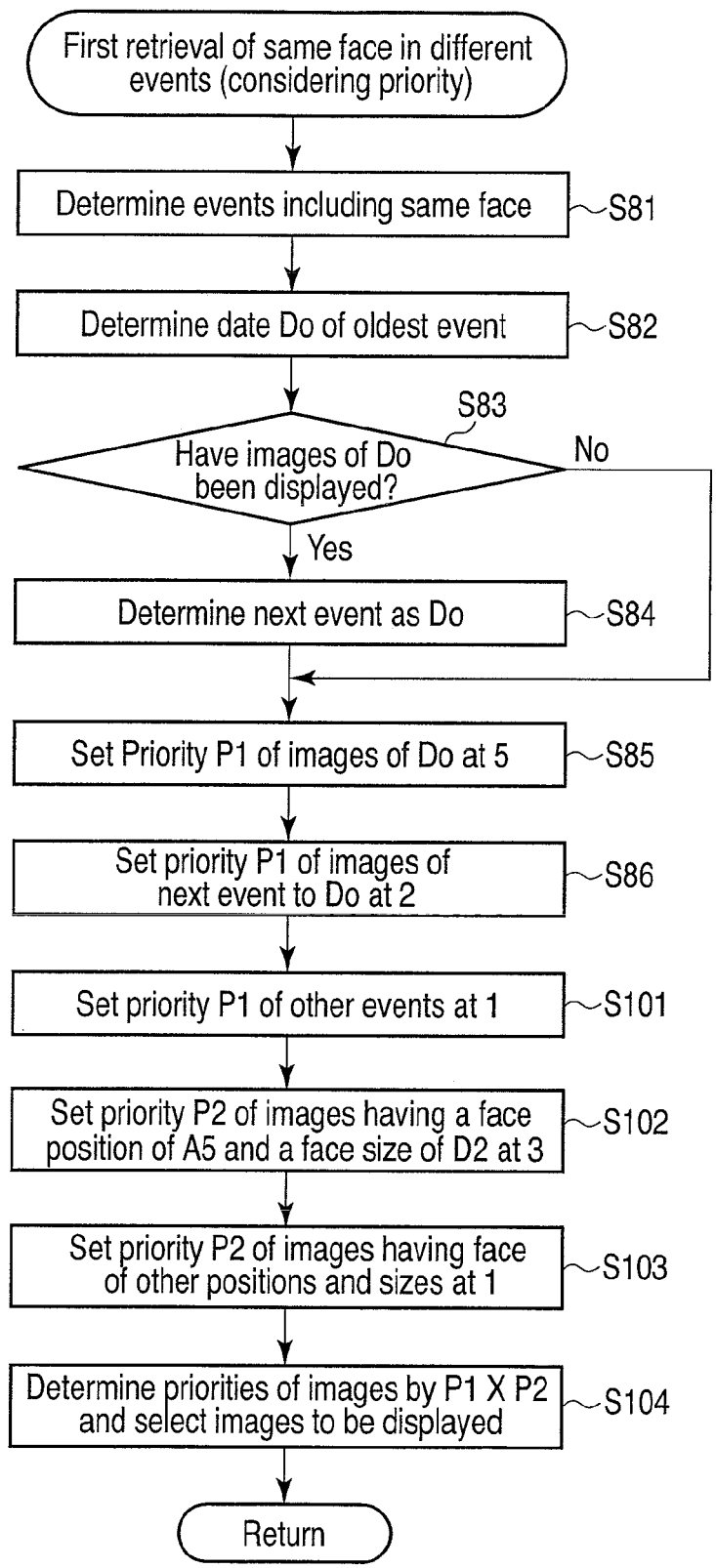
FIG. 11 is a flowchart illustrating a first retrieval operation for the same face in different events in the flowchart of the control operation of the camera.

The control section 11 performs a flowchart of a first retrieval of the same face in different events, illustrated in FIG. 11.

In step S81, the control section 11 determines the oldest event including the same person. In step S82, the control section 11 determines the date Do of the oldest event illustrated in FIG. 13. When image data items of the date Do have not been displayed in this image viewing, the control section 11 moves from step S83 to step S85, and sets a first priority P1 of image data items included in the event of the date Do at a large value, for example, "5". The first priority P1 is a priority of image data items determined on the basis of the date of the event.

Since optimum image data items are not always included in the target event, the control section 11 in step S86 sets a second priority P2 of an event of a date after the date Do at a higher value, for example, "2". The second priority P2 is a priority of image data items determined on the basis of a person included in the composition of the subject. This facilitates retrieval of other image data items including the person, who is included in the image data item being viewed, as main subject. The second priority P2 can also be called a priority according to the face image of a person. Although determination is performed in this step on the basis of the size and the position of the face, the posture and the expression of the person may be considered.

In step S102, when an image data item satisfies the condition that the face of the image data item is located in the center part of the display section 20a and has a predetermined size, the control section 11 increases the second priority P2 of the image data item satisfying the condition to "3".

In step S104, the control section 11 determines image data items to be displayed in accordance with the value obtained by multiplying the first priority P1 by the second priority P2 of the image data item. Specifically, image data items of an important event and an important subject are selected.

In steps 101 and 103, priorities of events and image data items which do not satisfy the conditions are lowered. When image data items of the date of the event having the higher priority are once displayed in this processing, the priority of the image data items is lowered in steps S83 and S84.

The control section 11 performs a flowchart of a second retrieval of the same face in different events, illustrated in FIG. 12.

In step S91, the control section 11 determines the oldest event including the same person. In step S92, the control section 11 determines a date Do of the oldest event illustrated in FIG. 13. In step S93, the control section 11 determines a date Dn of the event in which the image data item being displayed on the display section 20 was taken.

Image data items of the date Do are images of a distant date both from the date Dn and from this point of time. Therefore, when the image data items of the date Do are displayed on the display section 20, the user can get a fresh impression. Since displaying only an image data item of an event is dull, this embodiment shows an example in which two image data items are displayed. When displaying another image data item, selecting an image data item of a date distant from both the date Do and the date Dn vary the contents of the images, and tends to give a fresh impression.

In step S94, the control section 11 selects an event of a date Dm which is close to intermediate between the date Do and the date Dn. When image data items of the date Dm have not been displayed in this image viewing, the control section 11 moves from step S95 to step S97, and increases the priority P1 of image data items included in the event of the date Dm to "5". In the same manner as the above, since optimum image data items are not always included in the target event, the control section 11 increases, in step S98, the second priority P2 of an event of a date after the date Dm to "2". This operation facilitates selection of image data items including the person, who is included in the image data item being viewed, as main subject.

In step S102, when an image data item satisfies the condition that the face of the image data item is located in the center part of the display section 20a and has a predetermined size, the control section 11 increases the second priority P2 of the image data item satisfying the condition to "3". In step S104, the control section 11 determines image data items to be displayed in accordance with the value obtained by multiplying the first priority P1 by the second priority P2 of the image data item. As a result, image data items of an important event and an important subject are selected. In steps 101 and 103, priorities of events and image data items which do not satisfy the conditions are lowered. When image data items of the date of the event having the higher priority are once displayed in this processing, the priority of the image data items is lowered in steps S95 and S96.

As described above, image data items which were taken in important events and include faces whose sizes and positions satisfy the predetermined condition can be displayed with higher priority. It is possible to adopt a structure in which smiling faces can be detected, and images of faces with good expressions are selected with higher priority. It is possible to adopt applications such as changing the priority of the size of the face, and increasing the priority of image data items including a person together with other people, for example, one's parents.

Although two images are displayed outside the first display frame, three or more images may be displayed with the same idea.

Although the control section 11 determines an event of the past date Do before the shooting date Dn, the control section 11 may determine an event of a date after the shooting date Dn.

According to the above embodiment, not only image data items but also image data groups can automatically be classified. As a matter of course, image data groups and image data items can be classified and managed, not only by automatic classification but also by a method in which the user makes folders and stores image data items in the folders.

As described above, according to the above embodiment, wallpaper is automatically prepared when pictures are viewed, and it is possible to view albums joyfully and pleasantly.

Although the present invention is explained with an example of a camera in the above embodiment, the present invention is also applicable to simple display apparatuses and mobile phones as well as cameras, as a matter of course.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A display apparatus comprising:
an image recording section which records a plurality of image data items;
an event determination section which determines in what shooting opportunity a plurality of image data items are shot and acquired based on (1) information indicative of times and dates when the image data items are acquired and (2) whether the image data items include a person;
a display section which displays a plurality of kinds of events as shooting opportunities; and
a control section which, when a specific event is selected from the plurality of kinds of events, causes the display section to display a first image data item relating to the selected specific event, retrieves a second image data item including a person who is included in the first image data item from the image data items relating to unselected events, and causes the display section to display the retrieved second image data item together with the first image data item.

2. The display apparatus according to claim 1,
wherein the second image data item is given priority; and
the control section includes a priority determination section which preferentially retrieves the second image data item given the priority, when the second image data item including the person who is included in the first image data item is retrieved.

3. The display apparatus according to claim 2, wherein the priority determination section determines an oldest image data item of the image data items corresponding to the specific event as the second image data item.

4. The display apparatus according to claim 2, wherein the priority determination section lowers the priority given to an image data item that has been played back in a playback mode.

5. The display apparatus according to claim 2, wherein:
the priority relates to the times and dates and a face of the person; and
the priority determination section sets the priority of the times and dates higher than the priority of the face of the person.

6. The display apparatus according to claim 1, wherein the control section reduces the second image data item in size, and causes the reduced second image data item to be displayed outside a frame of the first image data item.

7. The display apparatus according to claim 6, wherein the control section causes the second image data item to be displayed outside the frame so as not to conceal the face of the person.

8. The display apparatus according to claim 1, further comprising an imaging apparatus including the control section, wherein:
the imaging apparatus acquires the plurality of image data items by a shooting operation; and
the control section performs image classification of the plurality of image data items based on information on the plurality of image data items acquired by the imaging apparatus, and determines whether the person is included in each of the plurality of image data items from results of the image classification.

9. The display apparatus according to claim 1, wherein the unselected events of the plurality of kinds of events are events on a day other than a day when the specific event occurs.

10. A method for retrieving and displaying similar image data items from a plurality of image data items, the method comprising:
determining in what shooting opportunity a plurality of image data items are shot and acquired based on (1) information indicative of times and dates when the image data items are acquired and (2) whether the image data items include a person;
displaying a plurality of kinds of events as shooting opportunities in a display section;
when a specific event is selected from the plurality of kinds of events, displaying a first image data item relating to the selected specific event;
retrieving a second image data item including a person who is included in the first image data item from the image data items relating to unselected events; and
displaying the retrieved second image data item together with the first image data item.

11. The method for retrieving and displaying similar image data items from a plurality of image data items according to claim 10, wherein:
the second image data item is given priority; and
the second image data item given the priority is preferentially retrieved, when the second image data item is retrieved.

12. The method for retrieving and displaying similar image data items from a plurality of image data items according to claim 11, wherein an oldest image data item of the image data items corresponding to the specific event is determined as the second image data item.

13. The method for retrieving and displaying similar image data items from a plurality of image data items according to claim 11, wherein the priority given to an image data item that has been played back in a playback mode is lowered.

14. A non-transitory recording medium which stores a computer-processable display program, comprising:
determining in what shooting opportunity a plurality of image data items are shot and acquired based on (1) information indicative of times and dates when the image data times are acquired and (2) whether the image data items include a person;
displaying a plurality of kinds of events as shooting opportunities in a display section;
when a specific event is selected from the plurality of kinds of events, displaying a first image data item relating to the selected specific event;
retrieving a second image data item including a person who is included in the first image data item from the image data items relating to unselected events; and
displaying the retrieved second image data item together with the first image data item.

15. The non-transitory recording medium which stores a computer-processable display program according to claim 14, wherein:
the second image data item is given priority; and
the second image data item given the priority is preferentially retrieved, when the second image data item is retrieved.

16. The non-transitory recording medium which stores a computer-processable display program according to claim 15, wherein an oldest image data item of the image data items corresponding to the specific event is determined as the second image data item.

17. The non-transitory recording medium which stores a computer-processable display program according to claim 15, wherein the priority given to an image data item that has been played back in a playback mode is lowered.

* * * * *